US 6,724,298 B2

(12) United States Patent
Smith

(10) Patent No.: US 6,724,298 B2
(45) Date of Patent: Apr. 20, 2004

(54) INDIVIDUAL DISCREET PROMPTING DEVICE WITH REMOTE

(76) Inventor: J. Michelle Smith, 111 Brandon Ct., Neshanic Station, NJ (US) 08853

( * ) Notice: Subject to any disclaimer, the term of this patent is extended or adjusted under 35 U.S.C. 154(b) by 94 days.

(21) Appl. No.: 09/923,622

(22) Filed: Aug. 7, 2001

(65) Prior Publication Data

US 2003/0030544 A1 Feb. 13, 2003

(51) Int. Cl.$^7$ ................................................ H04B 3/36
(52) U.S. Cl. ................ 340/407.1; 340/965; 340/573.1; 340/7.6; 368/230; 368/245; 434/114
(58) Field of Search .............. 340/407.1, 7.6, 340/573.1, 407.2, 539, 965, 309.15, 309.16, 539.1; 368/1, 10, 230, 245; 434/113, 114

(56) References Cited

U.S. PATENT DOCUMENTS

| 3,157,853 | A | * | 11/1964 | Hirsch | 340/407.1 |
|---|---|---|---|---|---|
| 4,300,129 | A | | 11/1981 | Cataldo | 340/539 |
| 4,456,387 | A | | 6/1984 | Igarashi | 368/230 |
| 4,779,615 | A | | 10/1988 | Frazier | 128/33 |
| 5,023,853 | A | | 6/1991 | Kawata | 368/230 |
| 5,089,998 | A | | 2/1992 | Rund | 368/72 |
| 5,282,181 | A | | 1/1994 | Entner et al. | 368/73 |
| 5,285,430 | A | | 2/1994 | Decker | 368/281 |
| 5,436,622 | A | | 7/1995 | Gutman et al. | 340/825.46 |
| 5,444,671 | A | | 8/1995 | Tschannen et al. | 368/10 |
| 5,619,181 | A | | 4/1997 | Murray | 340/407.1 |
| 5,823,932 | A | | 10/1998 | Speigel | 600/26 |
| 5,828,312 | A | | 10/1998 | Yamazaki | 340/825.44 |
| 5,861,797 | A | | 1/1999 | Becker | 340/309.3 |
| 5,966,655 | A | | 10/1999 | Hardouin | 455/38.2 |
| 6,091,321 | A | | 7/2000 | Karell | 340/425.5 |
| 6,150,942 | A | | 11/2000 | O'Brien | 340/573.1 |
| 6,218,958 | B1 | * | 4/2001 | Eichstaedt et al. | 340/407.1 |
| 6,236,317 | B1 | | 5/2001 | Cohen et al. | 340/573.1 |
| 6,359,550 | B1 | * | 3/2002 | Brisebois et al. | 340/407.1 |

OTHER PUBLICATIONS

Medication Reminders, www.epill.com/epill/pediatric.html, Vibrating Six Alarm Medication Reminder Watch—Pediatric, Jun. 14, 2001.
Vibralite 3,www.globalassitive.com/vb13.html, Vibration Watch with Auto–Reset Countdown Timer, Jun. 14, 2001.
Medication Reminders, www.epill.com/epill/watchminder.html, Watch Minder (TM) Vibrating REminder Device Pager size/Oversized watch, Jun. 14, 2001.
Comfort House, store.yahoo.com/comfort/vibalwat.html, Vibration Alarm Watch with Electro–Luminescent Back Light, Jun. 14, 2001.
Comfort House, yahoo search results, Vibration Alarm Watch—Deluxe and Standard, Jun. 14, 2001.

* cited by examiner

Primary Examiner—Donnie L. Crosland
(74) Attorney, Agent, or Firm—Mathews, Collins, Shepherd & McKay, P.A.

(57) ABSTRACT

A remotely activated sensory stimulation device comprised of a case, a tactile stimulatory means, a receiving unit, a transmitting unit and a controller. The amplitude and frequency of the tactile stimulation is adjustable to provide different prompts or to alter the prompt. The device is further camouflaged with a second functionality to eliminate any social stigma. The device is useful for teaching individuals with a variety of learning disorders including Autistic Spectrum Disorder, Attention Deficit Disorder and Attention Deficit Hyperactivity Disorder.

16 Claims, 2 Drawing Sheets

INDIVIDUAL DISCREET PROMPTING DEVICE WITH REMOTE

FIELD OF THE INVENTION

The invention relates to electromechanical devices adapted to be worn by children with Autistic Spectrum Disorder to be used in behavioral and educational settings. The term "Spectrum Disorder" refers to a related group of disabilities including autism, Asperger's Disorder and Persuasive Development Delay/Not Otherwise Specified (PDD-NOS), Rett's Disorder and Childhood Disintegrative Disorder. The device permits a teacher or therapist to activate a tactile stimulus to evoke a desired behavior.

BACKGROUND OF THE INVENTION

Wristwatches and other devices with silent tactile alarm systems have been described for a variety of applications. They have been developed as signaling devices for the deaf and hearing impaired. Similarly, they may find useful applications in environments with high noise levels or in situations, such as a meeting, a concert where an audible signal would either be undesirable or disruptive. Devices with tactile stimulation also have proven useful tools for teaching children with behavioral and learning impairments. These devices are easily concealed to avoid social stigma, only the individual wearing the device is aware of the signal which avoids disruption in a classroom environment and the devices can be programmed to adapt them to a variety of situations.

A watch with a tactile alarm and an electronic message display system developed primarily for adolescents with Attention Deficit Disorder (ADD) and Attention Deficit Hyperactivity Disorder (ADHD) has been described in U.S. Pat. No. 5,861,797. This device can be programmed to produce a tactile signal to alert the wearer that a preprogrammed message is being displayed on an output device. The message is a programmed reminder to initiate some predetermined behavior, e.g. take medication, or it can be programmed to be activated at fixed intervals to attempt to refocus behavior. These devices help enable an individual with ADHD to achieve higher levels of independence and maintain more normal performance levels in school.

Common behavioral disorders and learning disabilities differ widely in their severity, symptoms and available treatment modalities. The device described in U.S. Pat. No. 5,861,797 meets the specific needs of ADD and ADHD patients; however many conditions are more profound and combine learning and behavioral impairment. Autism and Asperger's Disorder are two examples that require much more individualized and intensive training methods and there is an unfilled and urgent need for new and improved techniques to train children with Autistic Spectrum Disorder to be as fully functional and independent as possible.

Autism is a syndrome with a broad spectrum of behavioral, sensory integration, and learning difficulties whose severity can range from mild to profound. Autistic children cannot bring new stimuli into a meaningful relationship with past experience. Auditory and visual messages give particular difficulty and as a consequence speech is not acquired or develops late in dysphasic form. The senses for touch and taste, and smell are preferred. The use of a tactile signal, therefore, might avoid some of the difficulties processing auditory signals and relies on touch or tactile stimulation which is more readily accommodated. The capacity for contact fails to develop normally and proximity to human beings is avoided and the autistic child can be severely withdrawn. This may result from the intolerable complexity of the visual and auditory stimuli emitted by a moving speaking individual. Children with autism have a strong tendency to maintain uniformity in the environment, and any attempt to interrupt a child in the course of a task may evoke anxiety and rage. Asperger's Syndrome is a diagnosis applied to children who have good language and cognitive skills but exhibit the social, emotional, behavioral impairments which occur in autistic children.

The severity and clinical manifestations of these conditions vary widely; however, with proper support and training, many patients suffering from autism and related disorders can learn to function more independently. Although the child frequently cannot communicate with others, he may have an outstanding ability for rote learning. Although training and education adapted from operant conditioning have achieved some measure of success, this has not lessened the need for new techniques to improve instruction and training and children with behavioral and learning disorders.

SUMMARY OF THE INVENTION

This invention has several aspects that are intended to enhance its value in treating and training children who exhibit the spectrum of learning and behavioral disabilities typically diagnosed as autism or Asperger's Disorder. The present device comprises a tactile stimulatory device which can be activated by remote control by a teacher or therapist attempting to teach a particular behavioral pattern. Activation of the device, therefore, provides a tactile cue to prompt a particular behavior pattern.

Because the patient may have altered sensitivity to tactile stimulation another aspect of the present device is an adjustable mechanism which permits the teacher, therapist or caregiver to adapt the intensity and characteristics of the response for a particular individual or situation. An individual may require a relatively high level of stimulation to recognize a behavioral cue whereas another individual may be unable to tolerate that stimulus. During the course of behavior training it may be frequently desirable to decrease the intensity of the stimulation in a stepwise manner as the patient becomes more proficient at exhibiting the desired behavioral pattern and ultimately to eliminate the stimulus when the behavioral pattern has been learned.

In addition to the remote activation of a tactile signal the present invention can also comprise an alarm that can be programmed to automatically activate at a particular time or to be activated at a regularly programmed interval. This has previously been described in devices for training ADD and ADHD patients. Since this aspect is distinct from the remote stimulation, the signal from the remote cue should be different and distinguishable from a programmed signal.

While teaching individuals with Autistic Spectrum Disorder is a particular application of the present device, the invention should not be construed to be in any way limited to this use. Tactile alarms have been adapted for a variety of situations where auditory or visual cues would be undesirable. Thus the technique can be used to produce a signal in meetings or gatherings where a visual alarm would be undesirable and disruptive. They also can be used in noisy environments where an audible signal may not be noticed. A combat situation or police operation represents still another situation where a normal alarm could be undesirable.

In a preferred embodiment of this invention a battery powered digital alarm wristwatch is combined with a electromechanical motor, suitable driven components and a receiving unit so that at preset times or when the receiving unit is activated by an external signal the motor induces a vibration which will signal the wearer.

DETAILED DESCRIPTION OF DRAWINGS

A more complete understanding of the present invention may be obtained from consideration of the following description in conjunction with the drawings in which.

DETAILED DESCRIPTION OF THE INVENTION

Figure 1:
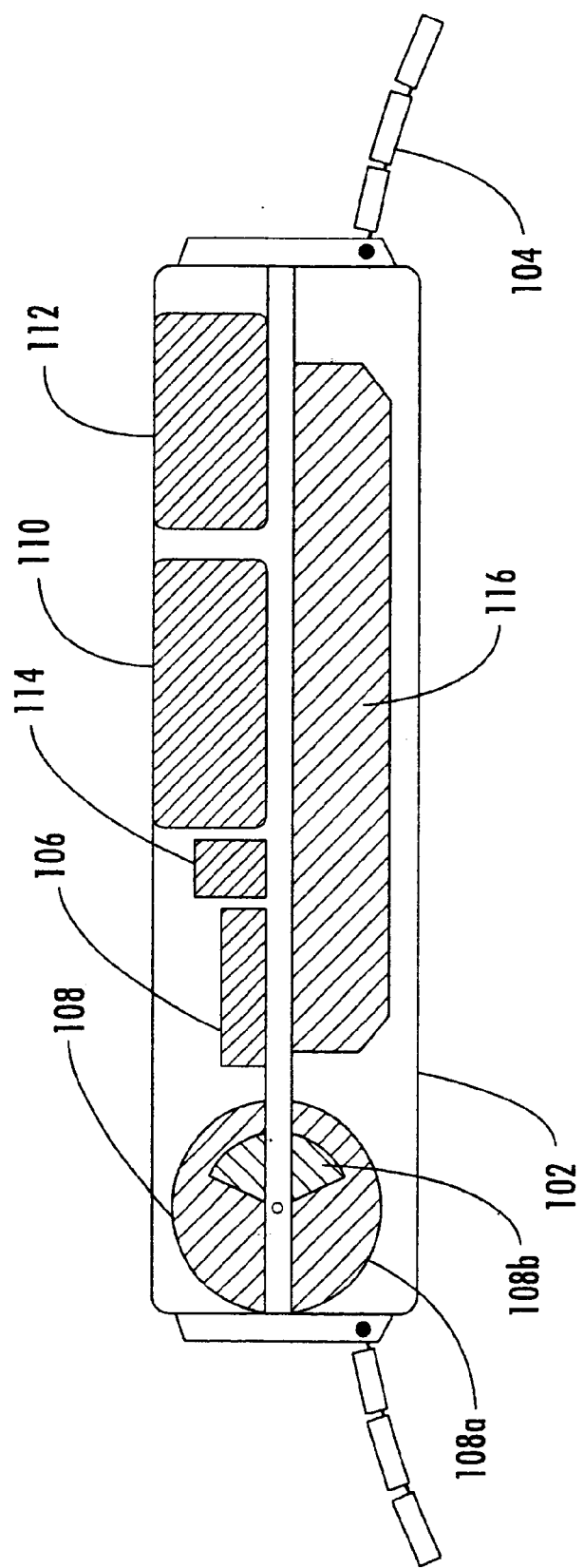
FIG. 1 is a perspective view showing the tactile stimulation device of this invention.
Figure 2:
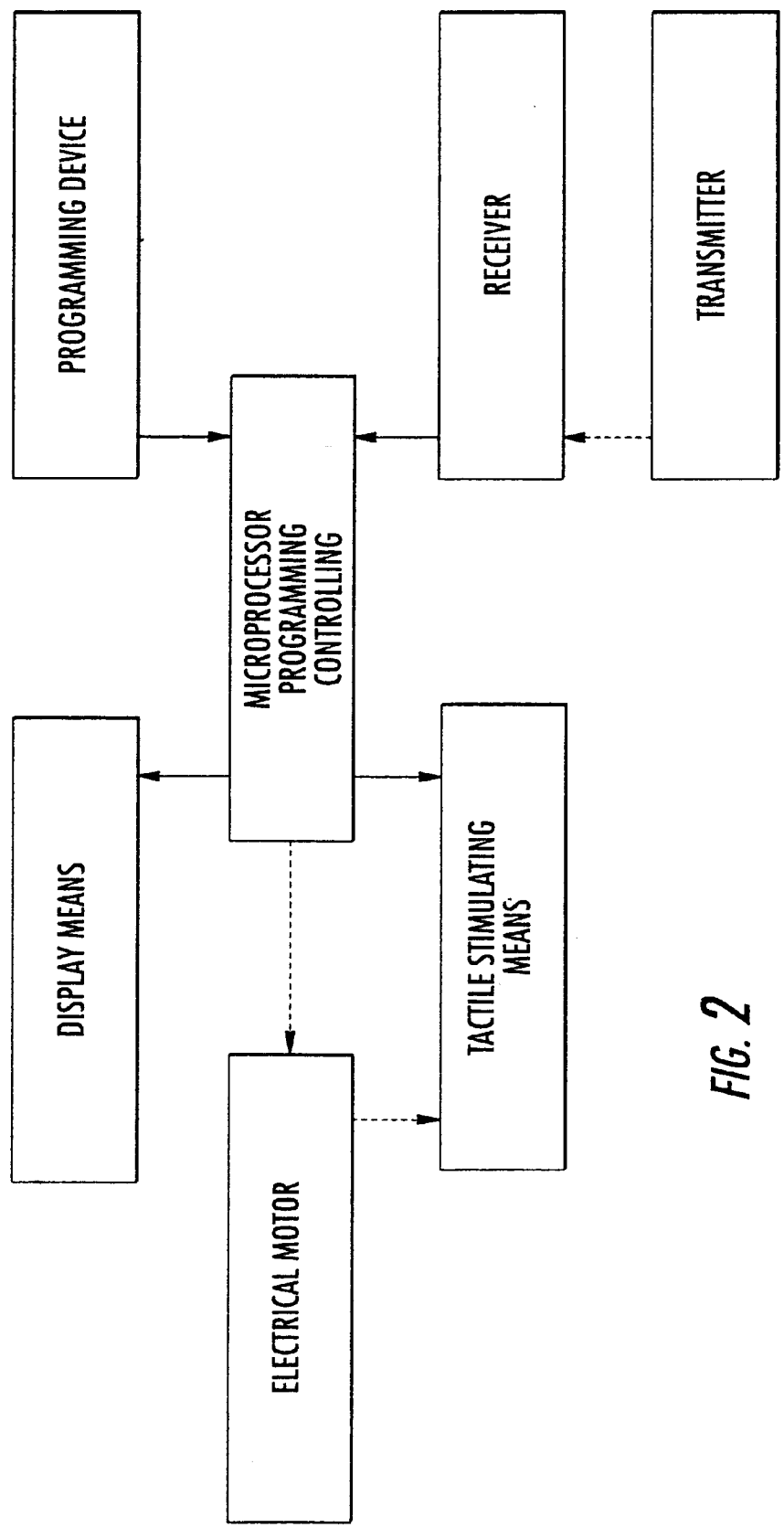
FIG. 2 is a block schematic diagram showing the functional relationship of the principal components of this invention.

Effectively teaching children with Spectrum Disorder requires frequent repetition and practice associating specific behavior responses to particular stimuli or instructions and frequent repetition of the learned behavior. Behavioral training has been successfully employed to limit self-injurious behavior and to teach the fundamentals of language and social behavior. This training, while ideally highly individual, often takes place in classroom setting where other children with a variety of learning or psychological disabilities are present. Their difficulties processing auditory and visual signals encountered makes the tactile alerting system particularly well suited to autistic children. Furthermore, in a classroom environment it is essential that training devices are focused on the intended patient and minimize disruption of the entire classroom environment. Any device used for training children with learning and behavioral disorders should be as unobtrusive as possible to avoid any stigma associated with its use. In the present invention the device can be camouflaged as a wristwatch so there is no indication that the child has special needs. A wristwatch, while common and inconspicuous, has a relatively limited volume in which to assemble the elements of the present invention and it should be appreciated that devices with alternative shapes may provide similar benefits and allow for larger elements or a plurality of elements which will extend the performance of these devices.

While tactile sensations may be processed more easily than visual or audible sensations, the children with sensory difficulties, including Spectrum Disorder, may exhibit a wide range of sensitivity to physical sensations ranging from hyposensitivity to extreme hypersensitivity. Thus one feature of the present device for training these individuals is the ability to optimize the intensity and frequency of the response for an individual and to alter the intensity and frequency as the learning process progresses. The device will also be useful to children with Attention Deficit Disorder (ADD), Attention Deficit Hyperactivity Disorder (ADHD) and other related behavioral, sensory and learning difficulties.

Tactile alarms have been adapted to a variety of devices for individuals with normal sensory processing and integration which are used in situations where an audible signal would be undesirable or disruptive including pagers, cell phones and wristwatches. The utility of these devices for individuals with learning disorders and special needs have also been recognized. For example, a tactile reminder device and method for its use in training children with ADD and ADHD was described in U.S. Pat. No. 5,861,797. This device combined a tactile alarm with a visual display adapted to display preprogrammed messages to provide a reminder message to the wearer. The tactile alarm can be programmed to provide a tactile signal at fixed intervals to prompt the wearer to pay attention. The present invention is specifically adapted to behavioral training for children suffering from autism and Asperger's Disorder; however, it can readily be adapted to other situations. The present invention has several features and no single feature is solely responsible for its desirable attributes.

One feature of the present device is an external case 102. The case holds a microprocessor 106, a clock chip 114, one or a plurality of vibrating devices 108 capable of producing multiple and/or adjustable vibrational stimuli, a device which displays the current time 110, a receiving unit 112 which can receive a remote signal that activates the device and selects the intensity of the signal and a power supply 116. In one particularly preferred form the case is adapted to be worn on the wrist and further comprises a band 104 and functions as a watch, which camouflages the alarm and signal functions of the device. While one embodiment of the present invention comprises a case camouflaged as a wristwatch, the shape of the case can be adapted to other common articles which may be worn on the belt as a pager, carried in a pocket, worn around the neck as a pendant. Some of these embodiments provide additional latitude in the selecting the physical dimensions of the device which will allow for alternative components to be housed therein. The alternate embodiments also allow for the tactile sensation to be applied to areas of the body other than the wrist if this increases perception of the tactile stimuli.

A second feature of the present device is one or more elements capable of transmitting vibrations to the case and subsequently to the surface of the wearer in contact with the case. A variety of devices have been described to produce vibrations. U.S. Pat. No. 5,282,181 describes a tactile wristwatch wherein the tactile stimulus is preferably obtained from the rotary action of a motor driven shaft 108a by connecting an operative means such as an off-center weight 108b, or eccentric plate, carrying centrifugally actuated arms to the motor shaft so as to impart an imbalance condition resulting in a vigorous shake or vibration, depending upon the velocity of the motor shaft, to the watch or by delivering a series of sideways blows to the alarm housing. U.S. Pat. No. 5,861,797 and U.S. Pat. No. 5,023,853 incorporate an unbalanced weight or eccentric wheel attached to the shaft of an electromechanical motor to produce vibrations that can be transmitted to the case of a silent alarm device. U.S. Pat. No. 5,436,622 incorporates an electromagnetic device containing a moveable permanent magnet attached to a case and located within an inducible electromagnetic field such that the permanent magnet will change positions as the electromagnetic is switched off and on to produce a vibration. U.S. Pat. No. 4,456,387 also describes magnetic means for inducing a vibration in a wristwatch. Yet another means to produce and transmit a vibration to a case is described in U.S. Pat. No. 5,285,430, which utilizes a piezo-electric device to drive an eccentric plate and impart vibrations to a case. A plunger means which delivers a blow to the wearer's arm and simultaneously tightening the band may also be used to impart a tactile signal. U.S. Pat. No. 5,089,998 describes a motor with a weighted cam mounted eccentrically to the motor's drive shaft so that when the motor is running it imparts substantial vibrations to the housing. Yet another means to impart vibration to the case is a magnetic device which can be used to strike the case and impart a vibration. The frequency and amplitude of the vibration will depend on the output of the vibrating device, the resonant frequency of the case and the manner of attachment to the case. Thus the structural features and layout may differ from one case to another and must be optimized for an individual device. Each of these devices can be adapted to the present invention and the references are herein incorporated by reference in their entirety. The above devices in no way are intended to limit the scope of the invention and the skilled artisan will readily identify alternative mechanisms to produce a tactile alert.

Adjusting the operating characteristics of the vibrating device may alter the nature of the vibrational stimuli. The present invention is envisioned to possess a plurality of means to activate a tactile stimulus and it is desirable to distinguish between these various activation modes. For example, the vibration produced by the remote activation should be distinguishable from that programmed to occur at regular intervals. Furthermore the stimulus should be adjustable to facilitate the learning process and eventually reach an endpoint where the desired behavior is achieved without an external prompt. The vibrational characteristics of these devices are all adjustable. An example, which is not meant to be limiting, is a setting in the microprocessor which controls the speed of an electromechanical motor linked to an eccentric cam that imparts vibration at every revolution. Alternately the case can contain a plurality of devices each of which imparts a unique mode of vibration and which is activated by different means. While the optimal vibration will vary considerably from one individual to another individual, an optimal range of vibrational frequencies for normal individuals generally is from 5 to 300 Hz. One skilled in the art of teaching children with learning disabilities would readily be able to optimize these ranges to for an individual in their care.

A third feature of the present invention is a receiving unit capable of receiving remote signals. The signal may be optical, electromagnetic or sonic. The receiver is operably linked to a controller that is activated when the receiver detects a signal. For training disabled children the preferred signals are optical or electromagnetic. The remote activation would most frequently come from a teacher or therapist in close proximity to the child trying to provide a tactile cue to prompt a desired behavioral response, but applications where remote signaling over a longer distances can be readily envisioned. A fourth feature of the present invention is a transmitting unit which will send a signal to the receiving unit to activate the vibrating stimulus. The signal will activate the vibrational alarm and allow the operator to continuously adjust the frequency and amplitude of the resulting vibrations in response to an individual's behavioral response. Thus the transmitting unit will allow the operator to "fade the prompt" as the individual displays the desired behavioral patterns. The transmitting unit should be small enough to be concealed in the palm of the operator's hand and designed to be inconspicuously activated and adjusted. This device will normally be activated by a teacher or therapist to prompt a response; but the device is not limited to teaching and other applications where remote signaling is desirable are readily imagined.

A fifth feature of the present invention is a programmable control mechanism. The control circuit includes a microprocessor, the clock circuit and a display unit and is linked to the receiver unit and the tactile alarm. The microprocessor receives electronic time and date data from the clock/calendar chip and its output is coupled to a display driver which drives the liquid crystal display. The microprocessor also activates the tactile alarm circuit. Activation of the tactile alarm either occurs when a signal is detected by the receiver unit that generates an input to the microprocessor or the microprocessor can be programmed to activate at a fixed time or at fixed intervals between a programmed start and a stop time.

The microprocessor is programmed by buttons which permit an operator to step through an application program to set the current time, the start and stop time for a series of alerts at a fixed time interval, the frequency and amplitude of the alert, the length of the duty cycle, or which vibrating device is to be activated by the interval alarm program if a plurality of vibrating devices are present. The microprocessor determines the frequency and amplitude of the output when an activation signal from the remote sensing device is received, or alternatively, which of a plurality of alert devices will be activated by the remote signal.

A seventh feature of the present invention is a method for assisting behavioral training of individuals suffering from autism and Asperger's Disorder. The method comprises remotely activating a vibration device which is in communication with the individual. The resulting vibrations are a signal that cues a desired behavior or response. As the child begins to associate a situation and a particular behavioral response, the cue is diminished to decrease reliance on the tactile prompt to initiate the behavior until the child independently associates the situation and behavior. A particular feature of the present device is it can be utilized with an individual in a larger classroom situation where only the patient is aware of the cue.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A programmable sensory stimulation device for treating and training a user having a learning or behavioral disability worn by a user at a point of contact, the device comprising:

a case;

a tactile stimulation apparatus coupled to said case, said tactile simulation apparatus comprising one or more vibrating devices producing adjustable vibrational stimuli for producing tactile stimulation of the user at the point of contact with said case;

a controller for activating said tactile stimulation apparatus and adjusting the frequency and amplitude of the vibrations of the vibrational stimuli in response to the user's behavioral response;

a receiver coupled to said controller, said receiver enables remote activation of said wherein tactile stimulation of the vibrational stimuli is provided to the user at the point of contact of said case.

2. The programmable sensory stimulation device as recited in claim 1 further comprising a clock circuit having a visual display coupled to said case and said device is camouflaged as a wristwatch.

3. The programmable sensory stimulation device as recited in claim 1 wherein said case is adapted to be attached to a belt.

4. The programmable sensory stimulation device as recited in claim 1 further comprising a transmitter in communication with said receiver by optical, electromagnetic or sonic means.

5. The programmable sensory stimulation device as recited in claim 1 wherein the tactile stimulation apparatus further comprises an electromechanical motor in communication with said case.

6. The programmable sensory stimulation device as recited in claim 1 wherein the tactile stimulation apparatus further comprises a piezoelectric transducer in communication with said case.

7. The programmable sensory stimulating device as recited in claim 5 wherein said electromechanical motor has an eccentric weight for generating a vibration.

8. The programmable sensory stimulation device as recited in claim 4 wherein the revolutions per minute of said electromechanical motor are variable and adjustable to produce the desired frequency and amplitude of the vibrations.

9. The programmable sensory stimulating device as recited in claim 1 wherein the tactile stimulation apparatus comprises a magnetic device for generating a vibration.

10. The programmable sensory stimulation device as recited in claim 1 wherein the said variable frequency ranges from approximately 5 MHz to about 300 MHz.

11. The programmable sensory stimulation device as recited in claim 1 wherein the frequency and amplitude of the tactile stimulation apparatus can be remotely adjusted.

12. The programmable sensory stimulation device as recited in claim 1 further comprising a power supply.

13. The programmable sensory stimulation device as recited in claim 1 wherein the tactile stimulation apparatus can be remotely activated by another individual.

14. A method of instruction of a disabled individual comprising
providing a sensory simulation device to the said individual, said tactile simulation device comprising:
a case;
a tactile stimulation apparatus coupled to said case, said tactile simulation apparatus comprising one or more vibrating devices producing adjustable vibrational stimuli for producing tactile stimulation of the user at the point of contact with said case;
a controller for activating said tactile stimulation apparatus and adjusting the frequency and amplitude of the vibrations of the vibrational stimuli in response to the user's behavioral response;
a receiver coupled to said controller, said receiver enables remote activation of said controller; and adjusting the frequency and amplitude of the vibrations of the vibrational stimuli in response to the individual's behavioral response.

15. The method of claim 14 wherein frequency and amplitude of the vibrations are decreased in a stepwise manner as the individual exhibits a desired behavioral response.

16. The method of claim 14 wherein the adjusting step is performed remotely to provide the minimum stimulation to elicit the behavioral response.

* * * * *